United States Patent Office 3,169,967
Patented Feb. 16, 1965

3,169,967
METHYL O-LOWER ALKANOYL-RESERPATES
Emil Schlittler, Madison, N.J., assignor to Ciba
Corporation, a corporation of Delaware
No Drawing. Filed Nov. 14, 1957, Ser. No. 696,335
9 Claims. (Cl. 260—287)

This application is a continuation-in-part of my copending application Serial No. 526,780, filed August 5, 1955, now U.S. Patent No. 2,824,874, issued February 25, 1958, which in turn is a continuation-in-part application of my application Serial No. 376,984, filed August 27, 1953 (now abandoned), which in turn is a continuation-in-part application of my application Serial No. 373,461, filed August 10, 1953 (now abandoned), which in turn is a continuation-in-part application of my application Serial No. 361,879, filed June 15, 1953 (now abandoned), which in turn is a continuation-in-part application of my application Serial No. 353,920, filed May 8, 1953 (now abandoned).

The present invention relates to new diesters of reserpic acid and salts thereof, as well as the preparation of such compounds.

From investigations I made jointly with J. Mueller and H. J. Bein, it is known that from *Rauwolfia serpentina* Benth. and alkaloid having sedative action can be isolated in pure form which is called reserpine [Experientia, Volume VIII, page 338 (1952)]. Reserpine also has a pronounced hypotensive action and is of great therapeutic importance. The alkaloid itself and the process of its preparation are more thoroughly described in U.S. Patent Application Serial No. 367,357, filed on July 10, 1953, now U.S. Patent No. 2,752,351, issued on June 26, 1956 to me and Johannes Mueller.

I have made the observation that when reserpine is treated with certain agents described below, a carboxylic acid is obtained, to which I have given the name reserpic acid. My investigations have shown that in addition to the free carboxyl group reserpic acid has a free hydroxyl group and can be represented by the formula:

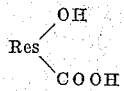

in which the radical "Res" stands for the divalent organic radical bound to the free hydroxyl and carboxyl groups in the reserpic acid.

Reserpic acid has the following physical characteristics: Melting point 239–245° C.; ultraviolet spectrum (in ethanol): maxima at $\lambda=224$ m$\mu$ ($\epsilon=31{,}000$); 270 m$\mu$ ($\epsilon=5{,}040$); 294 m$\mu$ ($\epsilon=6{,}520$); minima at $\lambda=250$ m$\mu$ ($\epsilon=3{,}440$); 280 m$\mu$ ($\epsilon=4{,}210$); Infrared spectrum (in "Nujol"): absorption bands at 3520–3480 (incline), 3240 (broad band), 2900, 2850 (broad band), 1625, 1605–1585 (broad band), 1570, 1505, 1465, 1395, 1378, 1365, 1317, 1280, 1242, 1221 (flat), 1201, 1163, 1140 1108, 1078, 1028, 973, 950, 905, 804, 750, 720. The micro-analysis gives the following values in percent: $C=65.66$; $H=7.33$; $N=6.98$, empirical formula: $C_{22}H_{28}O_5N_2$. The radical "Res" in the above structural formula has, therefore, the empirical formula: $C_{21}H_{26}O_2N_2$.

My investigations have further disclosed the fact that by conversion of the corboxyl group of reserpic acid into a carbomethoxy group methyl reserpate (reserpic acid methyl ester) of the formula:

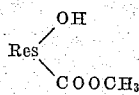

is formed, which can be converted into reserpine of the formula:

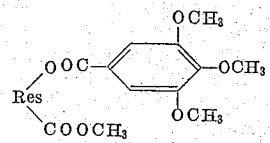

by esterfication of the free hydroxyl group with 3,4,5-trimethoxybenzoic acid.

The present invention relates particularly to the preparation of those esters in which the carboxyl group is esterified with an alkanol, preferably a lower alkanol, such as ethanol, propanol, isopropanol, butanol and above all methanol, and in which the hydroxy group is esterified with a carboxylic or sulfonic acid. Such carboxylic and sulfonic acids may be unsubstituted or substituted by one or several substituents. Such substituents are, for example, lower alkyl, e.g. methyl or ethyl; cycloalkyl, e.g. cyclohexyl; aryl, e.g. phenyl; hydroxyl; lower alkoxy, e.g. methoxy or ethoxy; aryloxy, e.g. phenoxy; acyloxy, e.g. acetoxy, ethoxycarbonyloxy or carbamyloxy; nitro; amino, e.g. primary amino, secondary or tertiary amino; or halogen, e.g. chlorine or bromine.

The preferred acids are carboxylic acids of the aliphatic, aromatic, araliphatic or heterocyclic series. Aliphatic acids are, for example, alkanoic acids, e.g. acetic, trimethylacetic, propionic, butyric, isocaproic, nonanoic or palmitic acid; or alkenoic acids, e.g. acrylic or crotonic acid. Aliphatic acids containing substituents are, for example, methoxy-acetic, ethoxycarbonyloxy-acetic, phenoxy-acetic, 4-nitro-phenoxy-acetic or 4-amino-phenoxy-acetic acid. Also included within the group of aliphatic acids are carbamic acids, for example, phenyl carbamic acids, e.g. phenylcarbamic, 2,5-dichloro-phenyl-carbamic, 4-nitro-phenyl-carbamic, 4-amino-phenyl-carbamic acid or carbamic acid itself. Aliphatic dicarboxylic acids suitable for the esterification with a lower alkyl reserpate are, for example, succinic, glutaric or maleic acid.

Another group of acids are aromatic acids. Such aromatic acids are, for example, benzoic acid or benzoic acids substituted with hydroxyl groups, e.g. 2-hydroxy-, 3,4- or 2,5-dihydroxy-benzoic acid; or with alkoxy groups, e.g. 2,3-dimethoxy-, 3,4-dimethoxy-, 3,4,5-trimethoxy-benzoic or 3,4,5-triethoxy-benzoic acid; benzoic acids substituted with nitro groups, e.g. 4- or 3-nitrobenzoic, 3,5-dinitro-benzoic or 2-methoxy-5-nitro-benzoic acid; benzoic acids substituted with halogen atoms, e.g. 3,4-dichloro-benzoic acid; aromatic dicarboxylic acids, e.g. phthalic or 3,4,5,6-tetrachloro-phthalic acid; or bi- or tricyclic aromatic carboxylic acids, for example, naphthoic acids, e.g. 1- or 2-naphthoic acid or 1-ethoxycarbonyloxy-2-naphthoic acid; or fluorenyl carboxylic acid.

Araliphatic acids are, for example, phenyl-acetic acids, e.g. phenyl-acetic, 4-nitro-phenyl-acetic, 4-amino-phenyl-acetic or diphenylacetic acid; or mandelic acids, e.g. $\alpha$-phenyl-$\alpha$-methoxy-acetic or $\alpha$-phenyl-$\alpha$-ethoxycarbonyloxy-acetic acid.

Heterocyclic carboxylic acids are, for example, monocyclic heterocyclic carboxylic acids, e.g. nicotinic or furoic acid; polycyclic heterocyclic carboxylic acids, e.g. quinoline carboxylic acids; or aliphatic carboxylic acids containing a heterocyclic ring, e.g. 2-thienyl-acetic acid.

Sulfonic acids are, for example, aliphatic sulfonic acids, e.g. ethane sulfonic acid; or aromatic sulfonic acids, e.g. p-toluene sulfonic acid.

Alkyl O-acyl-reserpates, in which alkyl stands especially for a lower alkyl radical, with the proviso that when acyl represents the 3,4,5-trimethoxybenzoyl radical, alkyl contains more than one carbon atom, the salts and the quaternary ammonium compounds thereof, are new. Such compounds have, like reserpine, valuable pharmacological properties and can be used as medicaments. Thus, for example, the following compounds exhibit reserpine-like, i.e. sedative and hypotensive activity: methyl O-veratroyl-reserpate, methyl O-anisoyl-reserpate and ethyl O-(3,4,5-trimethoxybenzoyl)-reserpate. A number of the new diesters of this invention have advantageous properties over reserpine, inasmuch as they are more water-soluble than the latter. Particularly the diesters of reserpic acid, in which the carboxyl group is esterified with a lower alkanol, e.g. methanol, and the free hydroxyl group is esterified with a dicarboxylic acid are water-soluble substances. Furthermore, some of the esters have quicker onset of action than resepine; thus, the onset of action of esters of methyl reserpate with benzoic acids containing at least one nitro group, is faster than that of reserpine. Furthermore, the ratio between hypotensive and sedative activity may show variations when compared with reserpine. The new esters may therefore be used in the treatment of hypertension and of states of overactiveness and stress.

The first stage of the process for the preparation of said diesters of reserpic acid comprises subjecting reserpine to the action of an alkaline saponifying medium.

Depending on the procedure which is followed, it is possible to split both ester groups or to saponify reserpine partially, splitting but the esterified hydroxyl group. To achieve one or the other end, one may work with different alkaline saponifying agents or with the same but under different conditions, as, for example, in the presence or absence of water, at a lower or higher temperature or for a longer or shorter period of time. Thus, when reserpine is heated for a comparatively long time with the solution of an alkali metal hydroxide, such as potassium hydroxide, in an alcohol, such as methanol, both ester groups are hydrolyzed. When the treatment is performed with the same agent under milder conditions, e.g. over a short period, only the esterified hydroxyl group is split.

Partial saponification, however, may be accomplished advantageously by using an alkaline saponifying agent capable of converting an esterified hydroxyl group into a free hydroxyl group with simultaneous reesterification of any hydrolyzed carboxyl group, which effect may be achieved by alcoholysis. This procedure is described in application Serial No. 376,523, filed August 25, 1953, now U. S. Patent No. 2,786,844, issued on March 26, 1957 to Harold B. MacPhillamy and Charles F. Huebner. According to this patent it is of advantage to treat reserpine with an anhydrous alcohol in the presence of an alcoholate, such as an alkali metal or aluminum alcoholate or some other alcoholyzing agent, such as sodium carbonate or piperidine. In absolute methanol in the presence, for example, of an alkali metal lower alkanolate, such as sodium methylate, or aluminum tertiary butylate, piperidine or sodium carbonate, there is formed methyl reserpate. When the alcoholysis is carried out in other absolute alcohols, such as ethanol or butanol in the presence, for example, of the corresponding alcholate, e.g. sodium ethylate or butylate or other alcoholyzing agents, there are obtained by reesterification the corresponding reserpic acid esters, such as ethyl reserpate or butyl reserpate. The products of this process are isolated by known methods. For conversion into reserpic acid, the esters can be further treated in an alkaline medium such as an alcohol solution of an alkali metal hydroxide, e.g. a methanol solution of potassium hydroxide.

Reserpic acid esters with a free hydroxyl group can also be obtained by treating reserpic acid with an esterifying agent capable of converting a carboxyl group into an esterified carboxyl group. To this end the reserpic acid can be converted into an ester thereof either directly or by way of a functional derivative thereof. Advantageously reserpic acid or a salt thereof is reacted with a diazoalkane, such as diazomethane or diazoethane, or it is esterified with an alcohol, especially an alkanol, in the presence of acid, such as a hydrohalic acid, e.g. hydrochloric acid.

To prepare the reserpic acid esters in which both functional groups are esterified, a reserpic acid ester with a free hydroxyl group is treated with an esterifying agent capable of converting a hydroxyl group into an esterified hydroxyl group. One procedure is to react a reserpic acid ester containing a free hydroxyl group with the desired acid, advantageously in the form of a reactive functional derivative thereof, especially a halide, e.g. chloride or bromide; or an anhydride. The reaction is preferably conducted in the presence of a diluent and/or a condensing agent. When an acid halide is used it is recommended to work in an anhydrous solvent in the presence of an acid-binding agent, such as an alkali metal or an alkaline earth metal carbonate e.g. sodium carbonate, potassium hydrogen carbonate or calcium carbonate; or a strong organic base, such as a tertiary amine, e.g. pyridine or collidine. An acid halide is preferably used in the presence of pyridine as solvent. An acid anhydride may be used in the absence or presence of an inert solvent, and if necessary, in the presence of catalytic amounts of an acid, e.g. sulfuric acid.

Substituents attached to the esterifying acid derivative used in the esterification step may be converted simultaneously or subsequently to this process. Thus, esterified hydroxyl groups, e.g. those esterified with a carbonic acid derivative, may be easily converted into free hydroxyl groups by mild hydrolysis, e.g. with aqueous ammonia. Or, free hydroxyl groups may be esterified with acids, preferably derivatives thereof; for example, a free hydroxyl group may be treated with ethyl chloro-carbonate to form an ethoxycarbonyl-oxy group. Furthermore, a nitro group attached to the acyl portion of the alkyl O-acyl-reserpate may be converted into amino groups by treating the diester with a reducing agent, such as catalytically activated hydrogen, e.g. hydrogen in the presence of platinum oxide.

Depending on the method of working, a reserpic acid ester is obtained in the form of the free base or as a salt thereof. A free base can be converted into a therapeutically useful, non-toxic acid addition salt, for example, by treatment with an inorganic or an organic acid, such as a hydrohalic acid, e.g. hydrochloric acid; sulfuric acid, phosphoric acid, nitric acid, hydroxyethane sulfonic acid, toluene sulfonic acid, acetic acid, tartaric acid, or citric acid, preferably in an alcohol, e.g. ethanol or an ether solution. From a salt, a reserpic acid ester can be obtained as a free base, for example, by reacting the salt with silver carbonate or aqueous ammonia. Reserpic acid esters yield upon treatment with quaternizing agents the quaternary ammonium salts, for example, by reaction with reactive esters of lower alkanols, such as alkylhalides, e.g. methyliodide or ethylbromide; dialkyl sulfates, e.g. dimethylsulfate or diethylsulfate; or alkyl esters of organic sulfonic acids, e.g. methyltoluene sulfonate. The diesters, salts or quaternary ammonium compounds thereof may also crystallize as hydrates, e.g. hemihydrates, monohydrates, sesquihydrates or polyhydrates.

In the afore-described reactions, the starting materials can also be used in the form of the salts mentioned. Instead of reserpine, material containing reserpine can be used as starting material, such as an extract from plant material of the Rauwolfia species, e.g. of *Rauwolfia serpentina* Benth.

The following examples will serve to illustrate the invention. The relationship of parts by weight to parts by volume being the same as the gram to the milliliter. Temperatures are given in degrees centigrade.

Example 1

One part by weight of reserpine is refluxed with 40 parts by volume of 1 N methanolic potassium hydroxide, under nitrogen for 1½ hours. The solution is cooled, adjusted to pH 1–2 with 1:1-hydrochloric acid (6 N), and filtered to remove potassium chloride. The filtrate is evaporated almost to dryness, slurried with two 25 parts by volume portions of ether and partially dissolved in 25 parts by volume of methanol. The methanol is evaporated almost to dryness and the residue again extracted with two 25 parts by volume portions of ether. The solid remaining is dissolved in 50 parts by volume of methanol, adjusted with 1 N methanolic potassium hydroxide to about pH 6 and evaporated almost to dryness. Addition of 50 parts by volume of chloroform dissolves the bulk of the solid, leaving potassium chloride. Evaporation of the chloroform extract leaves crude reserpic acid which crystallizes on the addition of a small amount of methanol and warming in a water bath. Ether is added dropwise to complete the crystallization and the crystals are filtered and washed with ether. The reserpic acid thus obtained in the form of the hydrochloride melts at 255–258°. It has the empirical formula:

$$C_{22}H_{28}O_5N_2 \cdot HCl$$

The hydrochloride is very soluble in water, substantially insoluble in dry chloroform and moderately soluble in methanol-chloroform. It has optical rotations: $[\alpha]_D^{25} = -75°$ (1% $H_2O$) and $[\alpha]_D = -80 \pm 3°$ ($CHCl_3$). The compound analyzes as follows in percent: C=59.59; H=7.06; N=6.2; Cl=8.12; O=19.03 (by difference). The compound exhibits characteristic absorption bands in the infrared region of the spectrum when suspended in solid form in a hydrocarbon oil (Nujol) at the following frequencies expressed in reciprocal centimeters: 3450 (broad band), 3225, 2915 (broad band), 2850–2880 (flat), 2585 (broad band), 1685, 1630, 1605, 1578, 1511, 1482, 1465, 1450, 1405, 1370, 1350, 1335, 1310, 1290, 1265, 1250, 1230, 1205, 1160, 1145, 1090, 1075, 1055, 1020, 980, 950, 900, 870, 840, 820, 780, 755, 712, 675 and 625. In ethanol, reserpic acid hydrochloride exhibits absorption bands in the ultra-violet region of the spectrum having maxima at 222 m$\mu$ ($\epsilon$=33,330), 268 m$\mu$ ($\epsilon$=5,150), 294 m$\mu$ ($\epsilon$=6,776); and minima at 248 m$\mu$ ($\epsilon$=2,942) and 278 m$\mu$ ($\epsilon$=4,146).

Reserpic acid hydrochloride can be converted to the free acid as follows: 0.1 part by weight of reserpic acid hydrochloride is dissolved in 10 parts by volume of methanol and stirred with 0.125 part of powdered silver carbonate for 10 minutes. The solution is filtered to remove excess silver carbonate and the silver chloride formed, and the filtrate evaporated to dryness, whereupon a pale yellow solid is obtained. Recrystallization from 1–2 parts by volume of methanol yields almost colorless crystals of reserpic acid, M.P. 239–245°. Analysis: C=65.66, H=7.33, N=6.98, O=20.03 (by difference). In ethanol the free reserpic acid exhibits absorption bands in the ultraviolet region of the spectrum having maxima at 224 m$\mu$ ($\epsilon$=31,000), 270 m$\mu$ ($\epsilon$=5,040), 294 m$\mu$ ($\epsilon$=6,520); and minima at 250 m$\mu$ ($\epsilon$=3,440) and 280 m$\mu$ ($\epsilon$=4,210). The free reserpic acid exhibits characteristic absorption bands in the infrared region of the spectrum when suspended in solid form in a hydrocarbon oil (Nujol) at the following frequencies expressed in reciprocal centimeters: 3520–3480 (incline), 3240 (broad band), 2900, 2850 (broad band), 1625, 1605–1585 (broad band), 1570, 1505, 1465, 1395, 1378, 1368, 1317, 1820, 1242, 1221 (flat), 1201, 1163, 1140, 1108, 1078, 1028, 973, 950, 905, 829, 804, 750, 720.

The reserpic acid can be converted to the hydrochloride as illustrated by the following example: 0.1 part by weight of reserpic acid is slurried in 5 parts by volume of methanol and the pH adjusted to 3-4 by adding several drops of 1:1 hydrochloric acid. The resulting solution is concentrated under reduced pressure to a small volume, whereupon white crystals are formed. After standing a few minutes, the crystals are filtered off. The reserpic acid hydrochloride thus obtained melts at 257–260°. The mother liquor, on standing, yields further crystals of reserpic acid hydrochloride.

The free reserpic acid may also be converted into metal salts, for example, the alkali metal salts, as illustrated by the following example: 0.1 part by weight of reserpic acid is mixed with 0.25 part by volume of 1 N methanolic potassium hydroxide. The solution thus obtained is filtered, and the filter washed with 1 part by volume of methanol. To the filtrate is added 25 parts by volume of ether, whereupon potassium reserpate precipitates as a white powder. The salt is collected on a filter and washed once with 5 parts by volume of ether and dried. The salt begins to char at above 200°, is black at 250° and melts at 270–300°.

Alkaline earth metal salts, e.g. barium and calcium salts can be prepared in a similar manner by employing the appropriate alkaline earth metal bases.

The reserpine employed as the starting material in the above example may be prepared as described in the aforementioned U.S. patent application Serial No. 367,357, filed July 10, 1953, now U.S. Patent 2,752,351, issued on June 26, 1956 to me and Johannes Mueller. The following illustrates the process: 7,000 parts by weight of powdered bark obtained from the roots of Rauwolfia serpentina Benth. are percolated with 35,000 parts by volume of methanol. After evaporating the methanol extract, 1,050 parts by weight of a dark colored powder are obtained, which is treated with water repeatedly. The remaining insoluble residue is then treated five times, each time with 1,500 parts by volume of 10% aqueous acetic acid and the solution separated from the oily portion by centrifugation. The brown acetic acid solution is either concentrated at low temperature or diluted with half of its volume of water and then has a pH of about 3.9. This solution is extracted with a total of 3,500 to 4,000 parts by volume of chloroform divided into 3 to 4 portions. The chloroform extracts are washed once with potassium carbonate solution and twice with water, then dried with sodium sulfate and completely evaporated in vacuum. The residue of 70 to 80 parts by weight is a green-brown colored powder. For further processing, this residue is dissolved in benzene and chromatographed on 1,000 to 1,200 parts by weight of neutral aluminum oxide (Activity II–III according to the Brockmann standard). By eluting with benzene a small amount of a yellow oil is obtained first and afterwards 0.9 part by weight of a physiologically inactive crystalline material with a M.P. of 238–239° and then the sedatively active component follows. As soon as the main part of the active component is eluted, the chromatographic column is then further eluted with a mixture of 2 parts by volume of benzene and 1 part by volume of acetone. By doing so the remainder of the sedative principle is eluted and then physiologically inactive crystalline material with a M.P. of 141–143° follows. The fractions which contain the sedative factor are evaporated to dryness. By recrystallizing the residue from hot acetone or a mixture of chloroform and ether, 6.5 to 7 parts by weight of residue (reserpine) are obtained in almost colorless crystals melting at 262–263° C. (with decomposition) and with a rotation $[\alpha]_D = -117°$ (chloroform).

Example 2

To a suspension of 1.2 parts by weight of reserpic acid hydrochloride in 50 parts by volume of 50% ether-methanol is added an excess of an ether solution of diazomethane. Nitrogen is evolved and most of the material gradually goes into solution. The reaction mixture is allowed to stand about 18 hours at room temperature and then the excess diazomethane is removed by distillation. The resulting solution is filtered and concentrated to dryness under reduced pressure at less than 40°. The crystalline residue is recrystallized from methanol-ether solution and yields methyl reserpate, M.P. 240–242°. It has the empirical formula $C_{23}H_{30}O_5N_2$ and analyzes in percent as follows: C=66.68; H=7.34; N=7.06; O=18.92 (by difference); $[\alpha]_D=101 \pm 3°$ ($CHCl_3$). The compound is insoluble in water, soluble in methanol, ethanol and chloroform. In ethanol, it exhibits absorption bands in the ultraviolet region of the spectrum having maxima at 226 m$\mu$ ($\epsilon$=33,830), 270 m$\mu$ ($\epsilon$=5,090), 298 m$\mu$ ($\epsilon$=6.080); and minima at 252-4 m$\mu$ ($\epsilon$=4,110) and 282 m$\mu$ ($\epsilon$=4,070). The compound exhibits characteristic absorption bands in the infrared region of the spectrum when suspended in solid form in a hydrocarbon oil (Nujol) at the following frequencies expressed in reciprocal centimeters: 3510, 3363, 2850–2950 (broad band), 1724, 1632, 1578, 1500, 1465, 1380, 1362, 1355, 1340, 1332, 1312, 1298, 1268, 1245, 1225, 1202, 1155, 1088, 1068, 1055, 1040, 1030, 1020, 1008, 970, 940, 912, 890, 860, 848, 835, 785, 770, 753, 720, 710, 655 and 625.

*Example 3*

0.267 part by weight of reserpic acid is suspended in 25 parts by volume of methanol to which has been added 2 drops of water. 30 parts by volume of an ether solution containing 0.57 part by weight of diazomethane are added and the reaction mixture allowed to stand at room temperature for about 24 hours. The excess diazomethane and part of the ether are evaporated under nitrogen, and the solution further evaporated to a yellow oil under reduced pressure. On standing, this crystallizes to a solid cake. On recrystallization from methanol, methyl reserpate (reserpic acid methyl ester) is obtained.

*Example 4*

A solution of approximately 1.2 parts by weight of diazoethane in 230 parts by volume of ether is added to a solution of 4.0 parts by weight of reserpic acid hydrochloride in 75 parts by volume of ethanol and allowed to stand overnight at room temperature. The excess diazoethane is removed by bubbling nitrogen through the solution which is then concentrated to a syrup under reduced pressure. Approximately 100 parts by volume of ethyl acetate are added, the mixture is warmed and a small amount of insoluble residue filtered off. Evaporation of the ethyl acetate yields semi-crystalline ethyl reserpate. After recrystallization from acetone, it melts at 220–225°.

In a similar manner, there may be prepared other esters of reserpic acid, e.g. the propyl and butyl esters from the corresponding diazoalkanes. Instead of employing diazoalkanes, the alcohols in the presence of an acid catalyst such as hydrochloric acid may be employed to esterify the reserpic acid. The esterifying agents may be employed in equivalent amounts or in excess.

*Example 5*

To 50 parts by volume of anhydrous methanol is added 0.1 part by weight of metallic sodium and when the ensuing reaction has ceased, 1.0 part by weight of reserpine is suspended in the solution. The mixture is refluxed for three hours during which time the material gradually dissolved. The solution is then concentrated under reduced pressure at 40–50° C. to about 15 parts by volume and 50 parts by volume of water are then added. The pH of the solution is adjusted to 4.5–5 by the addition of 10% sulfuric acid. The resulting acid solution is extracted three times with 50 parts by volume portions of ether. The aqueous phase is then made alkaline with concentrated ammonia and the precipitated material taken up in chloroform. The chloroform solution is washed with water, dried and the solvent removed. The resulting oil crystallizes and is identified as methyl reserpate.

*Example 6*

By following the same procedure as in Example 5 and using the same amounts of reagents, but employing dry ethanol, there is obtained an oily material comprising ethyl reserpate.

*Example 7*

By following the same procedure as in Example 5 and using the same amounts of reagents, but employing dry butanol, there is obtained an oily material comprising butyl reserpate.

*Example 8*

To a solution of 0.1 part by weight of methyl reserpate in 2 parts by volume of dry pyridine is added slowly with cooling 2 parts by volume of a pyridine solution containing 0.260 part by weight of 3,4,5-trimethoxybenzoyl chloride. The reaction mixture is allowed to stand at room temperature for 66 hours. At the end of that time 20 parts by volume of water is slowly added and the resulting solution distilled to dryness under reduced pressure at 40° C. The residue is taken up in chloroform and washed successively with water, 1% aqueous sodium hydroxide solution and water. After drying, the solvent is removed under reduced pressure at 40° C. leaving a semi-crystalline residue. Upon recrystallization from acetone a substance is obtained melting at 264–266° (with decomposition). A mixture of this substance with reserpine melts at 263–265°. Its infrared spectrum coincided with that of reserpine.

*Example 9*

A solution of 0.5 part by weight of methyl reserpate and 1.5 parts by weight of veratroyl chloride in 15 parts by volume of pyridine is allowed to stand for 5 days at room temperature and then diluted with approximately 25 parts by weight of ice. The solution is evaporated to dryness under reduced pressure at 50°, and the resulting glassy solid dissolved in 50 parts by volume of chloroform. The resulting solution is washed in succession with three portions of 50 parts by volume of 2% hydrochloric acid, three portions of 50 parts by volume of 2% potassium hydroxide solution, one portion of 50 parts by volume of 2% hydrochloric acid and finally with 50 parts by volume of water. The chloroform solution after drying over sodium sulfate is evaporated to dryness leaving an amber glassy-like material. This is dissolved in 10 parts by volume of benzene and chromatographed on a 10 parts by weight column of alumina (Brockmann activity II–III). Eluates of approximately 50 parts by volume each of benzene, 90 benzene:10 acetone, 60 benzene:40 acetone and 100 parts by volume of acetone are removed and evaporated to oily residues. A tarry product is removed in the benzene eluate. From the other eluate fractions, after triturating with a few drops of methanol, methyl O-veratroyl-reserpate is obtained. On recrystallization from acetone it melts at 230–233°.

*Analysis.*—Theory: C, 66.4; H, 6.6; N, 4.84. Found: C, 66.04; H, 6.55; N, 4.88. The empirical formula for the compound is: $C_{32}H_{38}O_8N_2$.

*Example 10*

A solution of 1.00 part by weight of methyl reserpate and 3.00 parts by weight of anisoyl chloride in 30 parts by volume of pyridine is allowed to stand four days at room temperature and then diluted with approximately 50 parts by weight of ice. A precipitate of anisic acid anhydride which forms is filtered from the mixture. The remaining solution is evaporated to dryness under reduced pressure at 50° and the resulting amber glassy product then dissolved in 50 parts by volume of chloroform. This is washed in succession with three portions of 100 parts by volume of 2% hydrochloric acid, three portions of 100 parts by volume of 2% potassium hydroxide solution, one portion of 100 parts by volume of 2% hydrochloric acid and finally with 100 parts by volume of water. The chloroform solution, after drying over sodium sulfate, is evaporated to dryness, leaving an amber glassy product. This is dissolved in 10 parts by volume of benzene and chromatographed on a 15 parts by weight column of Brockmann activity II–III alumina. Eluates of approximately 100 parts by volume of benzene, 90 benzene:10 acetone, 60 benzene:40 acetone and 200 parts by volume of acetone are removed and evaporated to oily residues. The bulk of tarry product is removed in the benzene eluate, and from the other fractions, which crystallize with the aid of acetone, methyl O-anisoyl-reserpate was obtained, M.P. 231.5–233.5°.

*Analysis.*—Theory: C, 67.8; H, 6.6; N, 5.10. Found: C, 67.94; H, 6.49; N, 5.08. The empirical formula for the compound is: $C_{31}H_{36}O_7N_2$.

*Example 11*

A solution of 5 parts by weight of methyl reserpate and 4.6 parts by volume of 2-furoyl chloride in 100 parts by volume of anhydrous pyridine is allowed to stand at 5° for two days. Most of the pyridine is removed under reduced pressure and the residue shaken with 200 parts by volume of ethyl acetate and 40 parts by volume of 5% sodium hydroxide solution. The ethyl acetate phase is then shaken with 40 parts by volume of 5% aqueous hydrochloric acid. The hydrochloride of the methyl O-(2-furoyl)-reserpate begins to crystallize and is filtered after ½ hour. On recrystallization from water it melts at 258–260°. The ester in the form of its free base is obtained by dissolving methyl O-(2-furoyl)-reserpate hydrochloride in 20 parts by volume of a warm 1:9 water-acetone mixture and basifying the resulting solution with aqueous ammonia. On addition of water, methyl O-(2-furoyl)-reserpate separates. After recrystallization from acetone-water the free base melts at 240–242° (with decomposition). The compound crystallizes with ½ molecule of water.

*Analysis.*—Theory: C, 65.0; H, 6.28; N, 5.4. Found: C, 65.02; H, 6.36; N, 5.53. The empirical formula for the compound is: $C_{28}H_{32}N_2O_7 \cdot \frac{1}{2}H_2O$.

*Example 12*

A solution of 5 parts by weight of methyl reserpate and 5 parts by volume of nicotinoyl chloride in 100 parts by volume of anhydrous pyridine is allowed to stand at 5° for two days. Most of the pyridine is removed under reduced pressure and the residue shaken with 200 parts by volume of ethyl acetate and 40 parts by volume of 5% aqueous sodium hydroxide. The ethyl acetate phase is next shaken with 40 parts by volume of 5% aqueous hydrochloric acid, whereupon the methyl O-nicotinoyl-reserpate hydrochloride is formed in solution. The solution is basified with ammonia and the methyl O-nicotinoyl-reserpate removed by filtration. It is recrystallized from acetone-water to yield the pure methyl O-nicotinoyl-reserpate, M.P. 255–256° (with decomposition).

*Analysis.*—Theory: C, 67.1; H, 6.4; N, 8.1. Found: C, 67.17; H, 6.23; N, 8.02. The empirical formula for the compound is: $C_{29}H_{33}N_3O_6$.

*Example 13*

A solution of 5 parts by weight of methyl reserpate in 100 parts by volume of anhydrous pyridine is shaken at room temperature with 6 parts by weight of cinnamoyl chloride for two days. Most of the anhydrous pyridine is removed under reduced pressure. 200 parts by volume of ethyl acetate and 40 parts by volume of 5% aqueous sodium hydroxide solution are added to the residue and on shaking the ester enters the ethyl acetate phase. The aqueous phase is separated and the ethyl acetate shaken with 40 parts by volume of 5% aqueous hydrochloric acid. This treatment removes any pyridine. The ethyl acetate is then washed with 40 parts by volume of 5% sodium hydroxide solution and concentrated to dryness. The residue is dissolved in 50 parts by volume of acetone and acidified to pH 3 with 8 N ethanolic hydrogen chloride. The addition of 200 parts by volume of ether precipitates the crude hydrochloride of the methyl O-cinnamoyl-reserpate. It is filtered off, washed with acetone and converted to the crystalline free base as follows: The hydrochloride is dissolved in 20 parts by volume of a warm 1:9-mixture of water-acetone and basified with aqueous ammonia. On addition of water the crystalline methyl O-cinnamoyl-reserpate separates. It is recrystallized from an acetone-water mixture, and melts at 240–243° (with decomposition).

*Analysis.*—Theory: C, 70.6; N, 5.2; H, 6.6. Found: C, 70.53; N, 5.13; H, 6.58. The empirical formula for the compound is: $C_{32}H_{36}N_2O_6$.

*Example 14*

A solution of 0.4 part by weight of methyl reserpate and 0.5 part by volume of phenylacetyl chloride in 10 parts by volume of pyridine is allowed to stand at room temperature for six days. After addition of 25 parts by weight of ice to the solution, a precipitate of phenylacetic anhydride which forms is filtered off and the solution evaporated to dryness under reduced pressure on a water bath at 50°. The residue is dissolved in 50 parts by volume of chloroform, and the chloroform solution is washed in succession, using 50 parts by volume each time, with three portions of 2% hydrochloric acid, three portions of 2% potassium hydroxide solution, one portion of 2% hydrochloric acid and one portion of water. After drying the chloroform solution over sodium sulfate, it is evaporated to dryness and the residue dissolved in 10 parts by volume of benzene. This is chromatographed on 10 parts by weight of Brockmann activity II–III alumina and the adsorbate eluted with approximately 50 parts by volume each of benzene, 90 benzene:10 actone, 60 benzene:40 acetone, and acetone. From the last two eluates methyl O-phenylacetyl-reserpate, M.P. 235–239°, is obtained by triturating with acetone.

*Example 15*

A solution of 0.5 part by weight of methyl reserpate and 2.0 parts by volume of 3,4-dichlorobenzoyl chloride in 15 parts by volume of pyridine is allowed to stand at room temperature for four days. After the addition of 25 parts by weight of ice, the solution is evaporated to dryness under reduced pressure on a water bath at 50°. The residue is dissolved in 50 parts by volume of chloroform and the chloroform solution washed in succession, using 50 parts by volume each time, with three portions of 2% hydrochloric acid, three portions of 2% potassium hydroxide solution, one portion of 2% hydrochloric acid and one portion of water. After drying over sodium sulfate, the chloroform solution is evaporated to dryness. The residue is dissolved in 15 parts by volume of benzene and chromatographed on 10 parts by weight of Brockmann activity II–III alumina. Eluates of approximately 50 parts by volume each of benzene, 90 benzene:10 acetone, 60 benzene:40 acetone and acetone are removed and evaporated to oily residues. From the last three eluates there is obtained methyl O-(3,4-dichlorobenzoyl)-reserpate, M.P. 239–243°, by triturating with acetone.

*Example 16*

A solution of 0.4 part by weight of methyl reserpate and 0.5 part by volume of isocaproyl chloride in 10 parts by volume of pyridine is allowed to stand at room temperature for six days. After addition of 25 parts by weight of ice, the solution is evaporated to dryness under reduced pressure on a water bath at 50°. The residue is dissolved in 50 parts by volume of chloroform and washed in succession using 50 parts by volume each time, with three portions of 2% hydrochloric acid, three portions of 2% potassium hydroxide solution, one portion of 2% hydrochloric acid and one portion of water. After drying over sodium sulfate, the chloroform solution is evaporated to dryness under reduced pressure and the residue treated with 20 parts by volume of benzene. A part of the residue is found to be insoluble in the benzene and after triturating with acetone is found to be methyl O-isocaproyl-reserpate, M.P. 225–226°. The benzene solution is chromatographed on 10 parts by weight of Brockmann activity II–III alumina. Eluates of approximately 50 parts by volume of benzene, 90 benzene:10 acetone, 60 benzene:40 acetone, and acetone are removed and evaporated to oily residues. From the last two eluates crystalline methyl O-isocaproyl-reserpate, M.P. 224–226°, is obtained by triturating with acetone.

*Example 17*

A suspension of 0.9 part by weight of methyl reserpate in 10 parts by volume of acetic anhydride is heated on the steam bath for one hour and then allowed to stand at room temperature overnight. At the end of this time, the crystals which form are filtered and the filtrate concentrated under reduced pressure to one third its volume. Again the crystals are filtered and, when combined with the previous crop, yield methyl O-acetyl-reserpate, M.P. 287–290°. On recrystallization from acetone, the product melts at 296–298°.

*Analysis.*—Theory: C, 65.7; N, 6.14; H, 7.05. Found: C, 65.65; N, 6.21; H, 7.04. The empirical formula for the compound is $C_{25}H_{32}N_2O_6$.

*Example 18*

A solution of 0.25 part by weight of ethyl reserpate and 3 drops of concentrated sulfuric acid in 5 parts by volume of acetic anhydride is boiled for 5 minutes and then allowed to cool slowly to room temperature. The solution is diluted with 40 parts by volume of ether which precipitates a yellow powder. This is filtered, slurried with 25 parts by volume of 5% sodium carbonate solution and the mixture extracted with 30 parts by volume of chloroform. After drying over sodium sulfate, the chloroform is evaporated under reduced pressure. From the residue is obtained ethyl O-acetyl-reserpate, M.P. 245–250°, by triturating with acetone.

*Example 19*

A solution of 0.5 part by weight of ethyl reserpate and 1.5 parts by weight of 3,4,5-trimethoxybenzoyl chloride in 15 parts by volume of pyridine is allowed to stand at room temperature for four days. After the addition of 25 parts by weight of ice, the solution is filtered to remove a precipitate of trimethoxybenzoic anhydride and evaporated to dryness under reduced pressure on a water bath at 50°. The residue is dissolved in 50 parts by volume of chloroform and washed in succession, using 50 parts by volume each time, with three portions of 2% hydrochloric acid, three portions of 2% potassium hydroxide solution, one portion of 2% hydrochloric acid and one portion of water. After drying over sodium sulfate, the chloroform solution is evaporated to dryness. The residue is dissolved in 15 parts by volume of benzene and chromatographed on 10 parts by weight of Brockmann activity II–III alumina. Eluates of approximately 50 parts by volume each of benzene, 90 benzene:10 acetone, 60 benzene:40 acetone and acetone are removed and evaporated to oily residues. From the 60 benzene:40 acetone eluate ethyl O-(3,4,5-trimethoxybenzoyl)-reserpate, M.P. 218–220°, is obtained by triturating with acetone.

*Example 20*

To a solution of 0.75 part by weight of methyl reserpate in 7.5 parts by volume of pyridine are added 1.6 parts by weight p-toluene-sulfonyl chloride. The reaction mixture is allowed to stand at room temperature in the dark for three and one-half days. At the end of this time about 30 parts by volume of water is added with cooling and the thus formed oil is extracted with three 15 parts by volume portions of chloroform. The combined extracts are worked up with 10 parts by volume of 5% sodium hydroxide solution and then three times with 10 parts by volume of water. After drying the solvent is removed under reduced pressure leaving a residue which crystallizes upon the addition of a small amount of benzene. After recrystallization from ethanol, methyl O-(p-toluenesulfonyl)-reserpate, M.P. 221–222°, is obtained.

*Analysis.*—Theory: C, 63.36; H, 6.38; N, 4.93; S, 5.64. Found: C, 63.68; H, 6.13; N, 4.72; S, 5.56. The empirical formula for the compound is: $C_{30}H_{36}N_2O_7S$.

*Example 21*

The following esters of lower alkyl reserpates are prepared according to the general procedure disclosed hereinbefore in the description and in the examples:

| | Melting point (in degrees centigrade) |
|---|---|
| Methyl O-benzoyl-reserpate | 235–236 |
| Methyl O-(2-hydroxy-benzoyl)-reserpate | 232–233 |
| Methyl O-hydrogen-phthaloyl-reserpate | 191–193 |
| Methyl O-(3-hydroxy-benzoyl)-reserpate | 181–182 |
| Methyl O-(3-nitro-benzoyl)-reserpate | 224–227 |
| Methyl O-(4-hydroxy-benzoyl)-reserpate | 249–252 |
| Methyl O-(4-nitro-benzoyl)-reserpate | 230–235 |
| Methyl O-(4-phenylazo-benzoyl)-reserpate | 205–211 |
| Methyl O-(2,3-dimethoxy-benzoyl)-reserpate | 220 |
| Methyl O-(2,5-dihydroxy-benzoyl)-reserpate | 180–185 |
| Methyl O-(2-hydroxy-5-nitro-benzoyl)-reserpate | 235 |
| Methyl O-(2-methoxy-5-nitro-benzoyl)-reserpate | 236 |
| Methyl O-(2,5-dimethoxy-benzoyl)-reserpate | 180–182 |
| Methyl O-(3,4-dihydroxy-benzoyl)-reserpate | 218–220 |
| Methyl O-vanilloyl-reserpate | 174–177 |
| Methyl O-(3,5-dimethoxy-benzoyl)-reserpate | 227–229 |
| Methyl O-(3,5-dinitro-benzoyl)-reserpate | 235–239 |
| Methyl O-(3,4,5-triethoxy-benzoyl)-reserpate | 209–211 |
| Methyl O-(3-hydroxy-4,5-dimethoxy-benzoyl)-reserpate | 228–233 |
| Methyl O-(3-ethoxycarbonyloxy-4,5-dimethoxy-benzoyl)-reserpate | 202–212 |
| Methyl O-(3-methoxy-4-ethoxycarbonyloxy-5-nitro-benzoyl)-reserpate | 188–200 |
| Methyl O-syringoyl-reserpate | 190–192 |
| Methyl O-(O-acetyl-syringoyl)-reserpate | 233–236 |
| Methyl O-(O-benzoyl-syringoyl)-reserpate | 230–236 |
| Methyl O-(3,5-dimethoxy-4-dimethylcarbamyloxy-benzoyl)-reserpate | 275 |
| Methyl O-(3,5-dimethoxy-4-ethylcarbamyloxy-benzoyl)-reserpate | 212–215 |
| Methyl O-(3,5-dimethoxy-4-phenylcarbamyloxy-benzoyl)-reserpate | 192–196 |
| Methyl O-(2-nitro-3,4,5-trimethoxy-benzoyl)-reserpate | 145–155 |
| Methyl O-hydrogen tetrachlorophthaloyl-reserpate | 215 |
| Methyl O-phenylcarbamyl-reserpate | 265 |
| Methyl O-(4-nitro-phenylcarbamyl)-reserpate | 242–245 |
| Methyl O-(4-amino-phenylcarbamyl)-reserpate | 250–255 |
| Methyl O-(2,5-dichloro-phenylcarbamyl)-reserpate | 272–277 |
| Methyl O-crotonyl-reserpate | 236–238 |
| Methyl O-trimethylacetyl-reserpate | 209–211 |
| Methyl O-hexahydrobenzoyl-reserpate | 223–225 |
| Methyl O-(4-ethoxycarbonylamino-hexahydrobenzoyl)-reserpate | 160 |
| Methyl O-nonanoyl-reserpate | 208–211 |
| Methyl O-palmitoyl-reserpate | 175–190 |
| Methyl O-hydrogen maleyl-reserpate | 195–197 |
| Methyl O-hydrogen succinyl-reserpate | 147 |
| Methyl O-hydrogen glutaryl-reserpate | 226–227 |
| Methyl-O-hydrogen-(4-cyclohexene-1,2-cis-dicarboxyloyl)-reserpate | 214–215 |
| Methyl O-methoxyacetyl-reserpate | 188–200 |
| Methyl O-ethoxycarbonyloxy-acetyl-reserpate | 100–110 |

| | Melting point (in degrees centigrade) |
|---|---|
| Methyl O-(4-nitro-phenoxy-acetyl)-reserpate | 145 |
| Methyl O-(4-amino-phenoxy-acetyl)-reserpate | 129–134 |
| Methyl O-(2-phenyl-2-methoxy-acetyl)-reserpate | 247–250 |
| Methyl O-(2-phenyl-2-ethoxycarbonyloxy-acetyl)-reserpate | 220–227 |
| Methyl O-(4-nitro-phenyl-acetyl)-reserpate | 228–236 |
| Methyl O-(4-amino-phenyl-acetyl)-reserpate | 198–208 |
| Methyl O-(2,5-dimethoxy-phenyl-acetyl)-reserpate | 190–192 |
| Methyl O-(3,4-dimethoxy-phenyl-acetyl)-reserpate | 175–178 |
| Methyl O-diphenylacetyl-reserpate | 225–227 |
| Methyl O-(fluorenyl-9-carboxyl)-reserpate | 205–210 |
| Methyl O-(3,4-methylenedioxy-cinnamoyl)-reserpate | 235–238 |
| Methyl O-(2-naphthoyl)-reserpate | 244–246 |
| Methyl O-(1-ethoxycarbonyloxy-2-naphthoyl)-reserpate | 182–185 |

It will be appreciated that other esters of alkyl reserpates than those illustrated by the above examples can be prepared in a similar manner. Thus, by esterifying ethyl reserpate with veratroyl chloride, anisoyl chloride, cinnamoyl chloride, phenylacetyl chloride, 3,4-dichlorobenzoyl chloride, isocaproyl chloride, and p-toluenesulfonyl chloride, according to the same procedure as described in the above examples, the corresponding ethyl reserpate esters, namely ethyl O-veratroyl-reserpate, ethyl O-anisoyl-reserpate, ethyl O-cinnamoyl-reserpate, ethyl O-phenylacetyl-reserpate, ethyl 3,4-dichlorobenzoyl-reserpate, ethyl O-isocaproyl-reserpate and ethyl O-p-toluene-sulfonyl-reserpate may be obtained.

In addition to the esterifying agents illustrated by the examples, there may be employed for this purpose other acids, either in the form of the acids per se, their anhydrides, or halides, for example, aliphatic acids, e.g. chloropropionic, methylethyl acetic, methylethylglycolic, stearic, chloracetic or aminoalkanoic acids; araliphatic acids, e.g. tropic or 1-naphthyl-acetic acid; aromatic acids, e.g. 2-methoxybenzoic, 4-toluic, resorcylic, orsellinic, pyrogallic, 4-chlorobenzoic acid; polycyclic acids, e.g. 1-naphthoic acid; heterocyclic acids, e.g. thienoic, picolinic or isonicotinic acids; and sulfonic acids, e.g. sulfanilic acid.

*Example 22*

To 2 parts by weight of reserpine, dissolved in 25 parts by volume of methylene chloride, is added 25 parts by volume of methyliodide. After standing for two days in the dark at room temperature, the solution is concentrated at one-fifth of its original volume. The solid is filtered off and recrystallized from hot methanol to yield reserpine monomethiodide, M.P. 265–266°.

Quaternary ammonium derivatives of reserpic acid and of other esters of reserpic acid can also be prepared in the same manner.

For therapeutical use the new pharmacologically active compounds, for example, methyl O-veratroyl-reserpate, methyl O-anisoyl-reserpate, methyl O-cinnamoyl-reserpate, methyl O-acetyl-reserpate and ethyl O-(3,4,5-trimethoxy-benzoyl)-reserpate may be made up into pharmaceutical adjuvant as a carrier. The compositions thus provided by the invention may be in any suitable solid or liquid dosage form, especially in a form suitable for oral or parenteral administration, e.g. tablets, powder, capsules, pills, solutions, emulsions or suspensions, e.g. in the form of ampouled injectable solutions. As pharmaceutical carriers there may be employed materials or mixtures of such which do not react with the new compounds and are therapeutically useful. Substances or mixtures thereof, such as water, gelatine, lactose, starch, magnesium stearate, talc, vegetable oils, benzyl alcohol, ascorbic acid, gums, glycols such as propylene glycol or polyalkylene glycol, petroleum jelly, tragacanth, alcohol or others may be employed. The new compositions contain a therapeutically effective amount of the new compounds per dosage unit, such as for example, from about 0.1 to about 50 parts by weight, advantageously from about 0.1 to about 10 parts by weight of methyl O-veratroyl-reserpate. In preparing the novel compositions the new compounds are admixed with the pharmaceutical carrier and formulated in the desired dosage unit form according to pharmaceutical practice. The compositions may be sterilized and may contain auxiliary substances such as preservative, stabilizing, wetting or emusifying substances, salts for the control of the osmotic pressure or buffer substances or besides the new compounds other therapeutically active substances, for example such as are used in combination with reserpine.

As therapeutically active substances which may be present in the compositions, there may be mentioned other hypotensive active substances, such as ganglionic blockers, e.g. N,N,N',N'-3-pentamethyl-N,N'-diethyl-3-azapentylene-1,5-diammonium dibromide, hexamethylene bis-trimethyl-ammonium bromide, pentamethylene bis-methylpyrrolidinium ditartrate or 2-(2-dimethylaminoethyl)-4,5,6,7-tetrachloroisoindoline dimethochloride; adrenergic blockers, e.g. 2-(N-p-tolyl-N-m-hydroxyphenyl-aminomethyl)-imidazoline or active derivatives of ergot alkaloids; hydrazino-pyridazines, e.g. 1,4-dihydrazino-phthalazine or 1-hydrazino-phthalazine. There may also be mentioned other sedative active substances such as barbiturates, 3-ethyl-3-phenyl, 2,6-dioxo-piperidine, N-(3-dimethylaminopropyl)-3-chloro-phenothiazine; central nervous stimulants, such as methyl α-piperidyl-(2)-α-phenyl-acetate or d,1-α-methyl-phenylethylamine; cholinergic blocking agents such as diethylaminoethyl α-cyclohexyl-α-phenyl-α-hydroxy-acetate methobromide, atropine or diethylaminoethyl 9-xanthene-carboxylate methobromide; or antihistamines such as 2-[benzyl-(2-dimethylaminoethyl)-amino]-pyridine.

What is claimed is:
1. Methyl O-lower alkanoyl-reserpate.
2. Methyl O-hexahydrobenzoyl-reserpate.
3. Reserpic acid methyl ester pivalate.
4. Methyl O-acetyl-reserpate.
5. Methyl O-(4-ethoxycarbonylamino-hexahydrobenzoyl)-reserpate.
6. Methyl O-isocaproyl-reserpate.
7. Ethyl O-acetyl-reserpate.
8. Methyl O-nonanoyl-reserpate.
9. Methyl O-palmitoyl-reserpate.

References Cited in the file of this patent
UNITED STATES PATENTS

| 2,752,351 | Schlittler | June 26, 1956 |
| 2,824,874 | Schlittler | Feb. 25, 1958 |

FOREIGN PATENTS

| 744,290 | Great Britain | Feb. 1, 1956 |

OTHER REFERENCES

Schlittler, Annals of N.Y. Acad. of Sciences, vol. 59, page 7, 1954.

UNITED STATES PATENT OFFICE
CERTIFICATE OF CORRECTION

Patent No. 3,169,967                              February 16, 1965

Emil Schlittler

It is hereby certified that error appears in the above numbered patent requiring correction and that the said Letters Patent should read as corrected below.

Column 1, line 65, for "corboxyl" read -- carboxyl --; column 3, line 15, for "resepine" read -- reserpine --; column 5, line 69, for "1368, 1317, 1820," read -- 1365, 1317, 1280, --; column 7, line 11, for "6.080" read -- 6,080 --; column 12, line 72, for "Methyl-O-" read -- Methyl O- --; column 13, line 54, for "at" read -- to --; column 14, line 37, after "-phenyl" strike out the comma.

Signed and sealed this 28th day of September 1965.

(SEAL)
Attest:

ERNEST W. SWIDER                              EDWARD J. BRENNER
Attesting Officer                                Commissioner of Patents